(12) United States Patent
Dong et al.

(10) Patent No.: US 10,216,047 B2
(45) Date of Patent: Feb. 26, 2019

(54) MOTHERBOARD, MOTHERBOARD OF DISPLAY PANEL, LIQUID CRYSTAL DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Tingze Dong, Beijing (CN); Dongsheng Huang, Beijing (CN); Jun Mo, Beijing (CN); Xing Qin, Beijing (CN); Xuejiao Huang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 34 days.

(21) Appl. No.: 15/021,795

(22) PCT Filed: Nov. 6, 2015

(86) PCT No.: PCT/CN2015/094019
§ 371 (c)(1),
(2) Date: Mar. 14, 2016

(87) PCT Pub. No.: WO2016/192305
PCT Pub. Date: Dec. 8, 2016

(65) Prior Publication Data
US 2016/0357071 A1 Dec. 8, 2016

(30) Foreign Application Priority Data
Jun. 3, 2015 (CN) .......................... 2015 1 0300328

(51) Int. Cl.
*G02F 1/1343* (2006.01)
*G02F 1/1337* (2006.01)

(52) U.S. Cl.
CPC .. *G02F 1/134309* (2013.01); *G02F 1/133784* (2013.01)

(58) Field of Classification Search
CPC ..................... G02F 1/133784; G02F 1/13378
See application file for complete search history.

(56) References Cited

U.S. PATENT DOCUMENTS

| 7,751,008 B2 * | 7/2010 | Minowa ................ G02F 1/1333 349/126 |
| 2004/0156003 A1 * | 8/2004 | Takachi ............ G02F 1/133784 349/123 |

(Continued)

FOREIGN PATENT DOCUMENTS

| CN | 101526697 A | 9/2009 | |
| CN | 103869546 A * | 6/2014 | ........... G02F 1/1309 |

(Continued)

OTHER PUBLICATIONS

Search Report and Written Opinion dated Jan. 20, 2016 from State Intellectual Property Office of the P.R. China.

(Continued)

*Primary Examiner* — Mariceli Santiago
(74) *Attorney, Agent, or Firm* — Dilworth & Barrese, LLP; Michael J. Musella, Esq.

(57) ABSTRACT

A motherboard, a motherboard of a display panel, a liquid crystal display panel and a display device are provided. The motherboard includes: a base substrate (101, 201), and a plurality of substrate units (102, 202) arranged in a matrix on the base substrate (101, 201); and a line layer (103, 203) insulated from the substrate units (102, 202) and arranged along a preset extending direction (AA', BB'), which is disposed within a peripheral region of the substrate units (Continued)

(102, 202). Because the line layer arranged along the preset extending direction is disposed within the peripheral space region of the substrate unit, when the alignment film on the substrate unit is aligned by a rubbing process, it can play a role in carding the rubbing cloth used in the rubbing process, to achieve an even rubbing effect, avoid an uneven rubbing phenomenon, and further facilitate improving a picture quality of the display panel.

18 Claims, 3 Drawing Sheets

(56) References Cited

U.S. PATENT DOCUMENTS

| | | | | |
|---|---|---|---|---|
| 2006/0132701 A1* | 6/2006 | Minowa | ............... | G02F 1/1333 349/187 |
| 2013/0229607 A1* | 9/2013 | Seong | ................. | G02F 1/1337 349/126 |
| 2015/0253596 A1* | 9/2015 | Zhang | ................. | G02F 1/1309 349/158 |

FOREIGN PATENT DOCUMENTS

| | | | |
|---|---|---|---|
| CN | 104020611 | A | 9/2014 |
| CN | 203894511 | U | 10/2014 |
| CN | 104280939 | A | 1/2015 |
| CN | 104330912 | A | 2/2015 |
| CN | 104849899 | A | 8/2015 |
| JP | 2007065063 | A | 3/2007 |
| JP | 2008111994 | A * | 5/2008 |
| KR | 20060105439 | A | 10/2006 |

OTHER PUBLICATIONS

First Chinese Office Action dated May 9, 2017.
Second Chinese Office Action dated Nov. 1, 2017.

* cited by examiner

MOTHERBOARD, MOTHERBOARD OF DISPLAY PANEL, LIQUID CRYSTAL DISPLAY PANEL AND DISPLAY DEVICE

TECHNICAL FIELD

The present disclosure relates to a motherboard, a motherboard of a display panel, a liquid crystal display panel and a display device.

BACKGROUND

The liquid crystal display panel mainly consists of an array substrate, a counter substrate and a liquid crystal layer located between the two substrates. In general, arrangement of liquid crystal molecules in their long axis direction in the liquid crystal layer is randomly aligned and disorganized; in order that most of the liquid crystal molecules have their long axis direction arranged along one direction, it is necessary to form an alignment film on the array substrate and the counter substrate, and a groove mark of a certain directivity is formed on the alignment film, so that the liquid crystal molecules can have their long axis direction arranged regularly along the direction of the groove mark.

SUMMARY

According to one embodiment of the present disclosure, there is provided a motherboard, comprising: a base substrate, and a plurality of substrate units arranged in a matrix on the base substrate, wherein, a peripheral region of the substrate units is provided with a line layer insulated from the substrate units and arranged along a preset extending direction.

In one example, the motherboard further comprises an alignment film disposed on the line layer and the substrate units; wherein, the alignment film has a groove mark of a preset direction as rubbed by a rubbing cloth; and the preset extending direction of a line in the line layer is the same as a preset direction of the groove mark of the alignment film.

In one example, a minimum distance between adjacent lines in the line layer is the same as a diameter of floss on the rubbing cloth.

In one example, the minimum distance between the adjacent lines in the line layer is 13 μm to 15 μm.

In one example, the line layer is of a single-layer structure or a multi-layer structure.

In one example, the line layer is disposed on a same layer with at least one of a gate line, a data line, a transparent electrode layer and an insulating layer in the substrate units.

In one example, widths of the respective lines in the line layer are 13 μm to 15 μm; and heights of the respective lines in the line layer are 200 Å to 1000 Å.

According to another embodiment of the present disclosure, there is provided a motherboard of a display panel, comprising a first motherboard and a second motherboard disposed opposite to each other; the first motherboard including a first base substrate and a plurality of substrate units arranged in a matrix on the first base substrate, and the second motherboard including a second base substrate and a plurality of substrate units arranged in a matrix on the second base substrate, wherein, at least one of the first motherboard and the second motherboard further includes a line layer insulated from the substrate units and arranged along a preset extending direction, which is disposed in a peripheral region of the substrate units.

In one example, the first motherboard is a motherboard of an array substrate, the substrate unit on the first motherboard is an array substrate unit; the second motherboard is a motherboard of a counter substrate, and the substrate unit on the second motherboard is a counter substrate unit.

In one example, an extending direction of a line in the line layer on the first motherboard is a first extending direction, an extending direction of a line in the line layer on the second motherboard is a second extending direction, and the first extending direction and the second extending direction are perpendicular to each other.

In one example, the motherboard of the array substrate further comprises an alignment film disposed on the line layer and the substrate units, on at least one of the first motherboard and the second motherboard; wherein, the alignment film has a groove mark of a preset direction as rubbed by a rubbing cloth; and the preset extending direction of the line in the line layer is the same as the preset direction of the groove mark of the alignment film.

In one example, a minimum distance between adjacent lines in the line layer is the same as a diameter of floss on the rubbing cloth.

According to another embodiment of the present disclosure, there is provided a liquid crystal display panel, comprising: an array substrate and a counter substrate cell assembled with each other, both the array substrate and the counter substrate including a display region and a peripheral region located in the periphery of the display region, wherein, the peripheral region of at least one of the array substrate and the counter substrate includes a line layer arranged along a preset extending direction.

In one example, an extending direction of a line in the line layer on the array substrate is perpendicular to an extending direction of a line in the line layer on the counter substrate.

In one example, the liquid crystal display panel further comprises an alignment film disposed on the line layer and the display region, on at least one of the array substrate and the counter substrate; wherein, the alignment film has a groove mark of a preset direction as rubbed by a rubbing cloth; and the preset extending direction of the line in the line layer is the same as the preset direction of the groove mark of the alignment film.

According to another embodiment of the present disclosure, there is provided a display device, comprising the liquid crystal display panel as mentioned above.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Figure 1A:
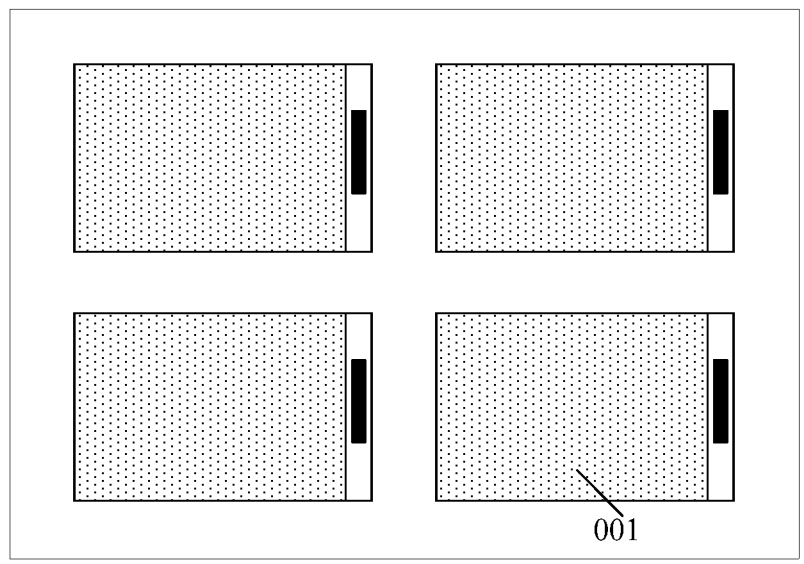
FIGS. 1a and 1b are respectively plan views of a motherboard in the prior art.
Figure 1B:
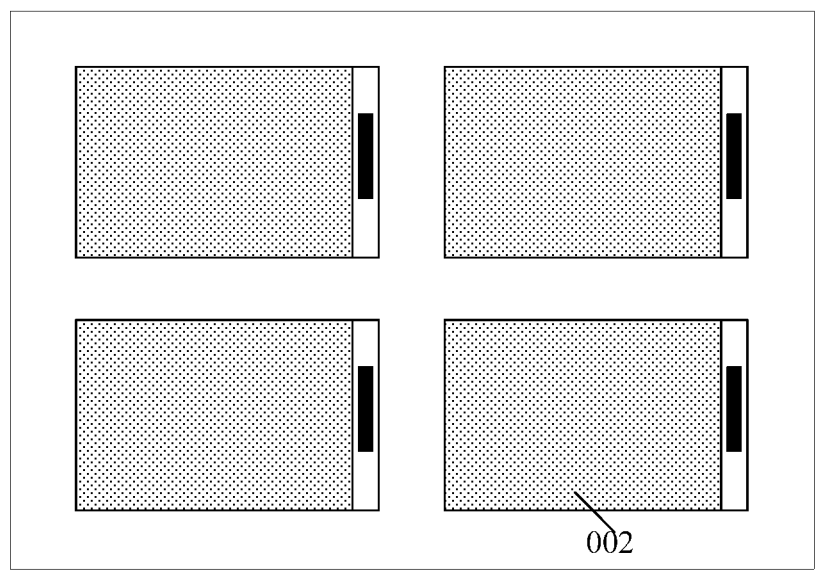

In a fabrication process of the liquid crystal display panel, first of all, as illustrated in FIGS. 1a and 1b, a plurality of array substrates 001 and a plurality of counter substrates 002, which are both arranged in a matrix, are respectively fabricated on two motherboards, and a layer of alignment film is formed separately on the array substrate and the counter substrate by spin coating and printing; then, it is necessary to perform a rubbing process on the formed alignment film, a rubbing roller is formed by wrapping a rubbing cloth covered by fine floss on a round roller; a surface of the alignment film is rubbed by using the floss on the rubbing cloth, with relative movement between the rubbing roller and the substrate coated with the alignment film, so as to form an alignment film having a groove mark of a certain direction; then a cell-assembling process is performed; and finally, the two motherboards are respectively cut along cutting lines on the two motherboards, to form a plurality of liquid crystal display panels. However, in an actual operation process, uneven rubbing is a serious quality problem generated in the rubbing process, which seriously affects a picture quality of a product, results in a lower ET detection rate, and causes serious waste of materials in the backend and quality problems.

Hereinafter, specific implementation modes of the motherboard, the box-formed motherboard, the liquid crystal display panel and the display device provided by the embodiments of the present disclosure will be illustrated in detail in conjunction with the drawings. Shapes and sizes of respective parts in the accompanying drawings do not reflect true proportions of the motherboard, but only aim to illustrate content of the present disclosure.

An embodiment of the present disclosure provides a motherboard, comprising: a base substrate, and a plurality of substrate units arranged in a matrix on the base substrate; and further comprising: a line layer insulated from the substrate units and arranged along a preset extending direction (i.e., extending along the preset extending direction) which is disposed in a peripheral space region of the substrate units.

Figure 2A:
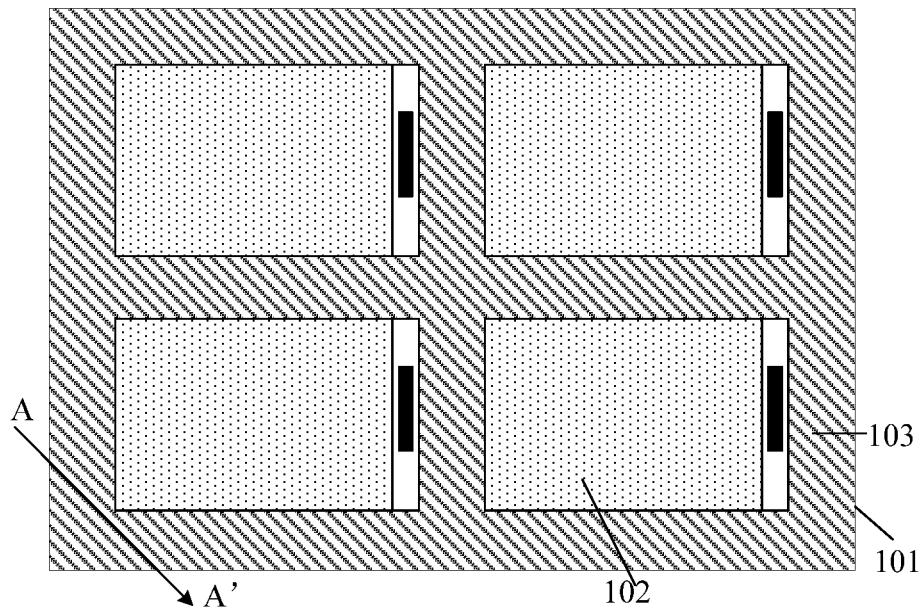
FIGS. 2a to 2d are respectively plan views of a motherboard provided by an embodiment of the present disclosure.
Figure 2B:
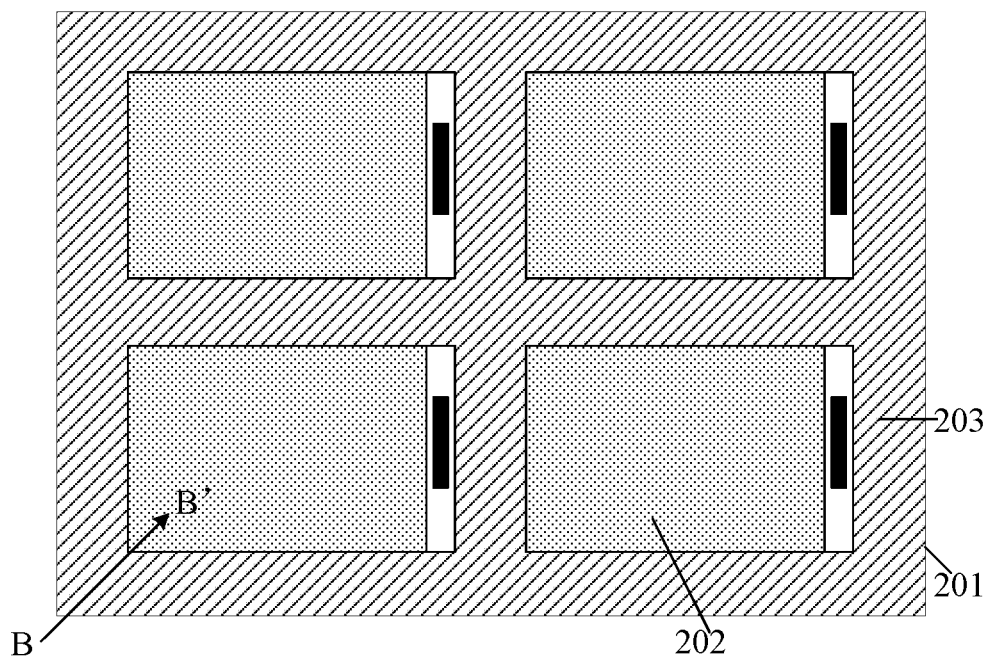

It should be noted that, each of the substrate units may be an array substrate unit, or, may be a counter substrate unit, which is not limited here. Thus, here the motherboard may not only be a motherboard of an array substrate, but also be a motherboard of a counter substrate, which may be collectively referred to as a motherboard of a display substrate. As illustrated in FIG. 2a, the motherboard may include a first base substrate 101, a plurality of array substrate units 102 arranged in a matrix on the first base substrate 101, a peripheral space region (i.e., a peripheral region) of the array substrate unit 102 is provided with a line layer 103 insulated from the array substrate units 102 and arranged along a first extending direction AA'; as illustrated in FIG. 2b, the motherboard may include a second base substrate 201, and a plurality of counter substrate units 202 arranged in a matrix disposed on the second base substrate 201, a peripheral space region of the counter substrate units 202 is provided with a line layer 203 insulated from the counter substrate units 202 and arranged along a second extending direction BB'. The first extending direction AA' and the second extending direction BB' in the drawings of this embodiment are only schematic, and they may be other extending directions. As illustrated in FIGS. 2a and 2b, the line layers 103 and 203 include a plurality of lines along the first extending direction AA' and the second extending direction BB'. The multiple lines are arranged substantially parallel to each other.

In the above-described motherboard provided by the embodiment of the present disclosure, since the line layer arranged along the preset extending direction is disposed within the peripheral space region of the substrate unit, when the alignment film on the substrate unit is aligned by a rubbing process, it can play a role in carding the rubbing cloth used in the rubbing process, to achieve an even rubbing effect, avoid an uneven rubbing phenomenon, and further facilitate improving the picture quality of the display panel.

In the above-described motherboard provided by the embodiment of the present disclosure, the motherboard further comprises: an alignment film disposed on both the line layer and the substrate units; since on the basis that the substrate units are provided thereon with the alignment film, the line layer is also provided thereon with the alignment film, in the actual rubbing process, the rubbing cloth can be less affected, and have a prolonged service life, which is of great significance in enhancement of productivity, reduction of costs, and improvement of the quality; the alignment film has a groove mark of a preset direction as rubbed by a rubbing cloth; in addition, the preset extending direction of the line in the line layer needs to be the same as a preset direction of the groove mark of the alignment film, so that it ensures the role in carding the rubbing cloth used in the rubbing process, to achieve an even rubbing effect.

In the above-described motherboard provided by the embodiment of the present disclosure, in order that the line in the line layer can match the rubbing cloth, to further ensure the role in carding the rubbing cloth, a minimum distance between adjacent lines in the line layer may be set to be the same as a diameter of the floss on the rubbing cloth.

In the above-described motherboard provided by the embodiment of the present disclosure, when the minimum distance between the adjacent lines in the line layer is set to be the same as the diameter of the floss on the rubbing cloth, since the diameter of the floss on the rubbing cloth is generally between 13 µm and 15 µm, the minimum distance between the adjacent lines in the line layer may be selected to be 13 µm to 15 µm. For selection of the minimum distance between the adjacent lines in the line layer, it may be specifically determined according to the diameter of the floss on the rubbing cloth used actually, and will not be limited here.

In the above-described motherboard provided by the embodiment of the present disclosure, widths and heights of respective lines in the line layer also affect the process of carding the rubbing cloth. The widths of the respective lines in the line layer may be set to be 13 µm to 15 µm; and the heights of the respective lines in the line layer may be set to be 200 Å to 1000 Å. For selection of the minimum distance between the adjacent lines in the line layer, it may be determined according to an actual situation, and will not be limited here.

It should be noted that, the number of the respective lines in the line layer is not limited, and a specific position can be arranged according to a specification of the motherboard, which will not be limited here; the extending direction of the respective lines in the line layer may be any direction for aligning the alignment film, and is not limited to the extending direction involved in the drawings of the present disclosure.

In the above-described motherboard provided by the embodiment of the present disclosure, the line layer may be set to be of a single-layer structure or a multi-layer structure, as long as it meets a condition that the heights of the respective lines in the line layer can ensure the role in carding the rubbing cloth. It may be determined whether the line layer is of the single-layer structure or the multi-layer structure according to actual situation, which will not be limited here.

In the above-described motherboard provided by the embodiment of the present disclosure, in order to simplify the fabrication process and save the costs, the line layer and a gate line, a data line, a transparent electrode layer or an insulating layer in the substrate unit may be disposed on the same layer. When the above-described motherboard provided by the embodiment of the present disclosure includes the plurality of array substrate units arranged in a matrix, the line layer of the single-layer structure may be disposed on a same layer with one of a gate line, a data line, a pixel electrode layer, a planarization layer or other film layers in the array substrate unit, and the line layer of the multi-layer structure may be disposed on a same layer with a combination of the gate line, the data line, the pixel electrode layer, the planarization layer or other film layers in the array substrate unit. For example, when the line layer is of the single-layer structure, the line layer and the gate line may be formed simultaneously by one patterning process, or, the line layer and the data line may be formed simultaneously by one patterning process; and when the line layer is of a dual-layer superimposed structure, one layer of the structure and the gate line may be formed simultaneously by one patterning process, and the other layer of the structure and the data line may be formed simultaneously by one patterning process, so that the fabrication process of the array substrate unit can be simplified, and the number of times for masking can be reduced. When the above-described motherboard provided by the embodiment of the present disclosure includes the plurality of counter substrate units arranged in a matrix, the line layer of the single-layer structure may be disposed on a same layer with one of a common electrode layer, a black matrix, a planarization layer or other film layers in the counter substrate unit, and the line layer of the multi-layer structure may be disposed on a same layer with a combination of the common electrode layer, the black matrix, the planarization layer or other film layers in the counter substrate unit. For example, when the line layer is of the single-layer structure, the line layer and the common electrode layer may be formed simultaneously by one patterning process, or, the line layer and the black matrix may be formed simultaneously by one patterning process; and when the line layer is of the dual-layer superimposed structure, one layer of the structure and the common electrode layer may be formed simultaneously by one patterning process, and the other layer of the structure and the black matrix may be formed simultaneously by one patterning process, so that the fabrication process of the counter substrate unit can be simplified, and the number of times for masking can be reduced.

An embodiment of the present disclosure further provides cell-assembled motherboards (a motherboard of a display panel), including a first motherboard and a second motherboard disposed opposite to each other; the first motherboard including a first base substrate and a plurality of array substrate units arranged in a matrix on the first base substrate, and the second motherboard including a second base substrate and a plurality of counter substrate units arranged in a matrix on the second base substrate.

The first motherboard further includes a line layer insulated from the array substrate unit and arranged along a first extending direction, which is disposed in a peripheral space region of the array substrate units; and/or, the second motherboard further includes a line layer insulated from the counter substrate units and arranged along a second extending direction, which is disposed in a peripheral space region of the counter substrate units.

For example, for a liquid crystal panel of a TN mode, as illustrated in FIGS. 2a and 2b, the first motherboard includes a first base substrate 101 and a plurality of array substrate units 102 arranged in a matrix on the first base substrate 101, and the second motherboard includes a second base substrate 201 and a plurality of counter substrate units 202 arranged in a matrix on the second base substrate 201; the first motherboard further includes a line layer 103 insulated from the array substrate units 102 and arranged along a first extending direction AA', which is disposed in a peripheral space region of the array substrate units 102; and the second motherboard further includes a line layer 203 insulated from the counter substrate units 202 and arranged along a second extending direction BB', which is disposed in a peripheral space region of the counter substrate units 202. The first extending direction AA' and the second extending direction BB' in the drawings of this embodiment are only schematic, and they may be other extending directions; and in general, for the liquid crystal panel of the TN mode, an included angle between AA' and BB' is approximately 90 degrees.

Figure 2C:
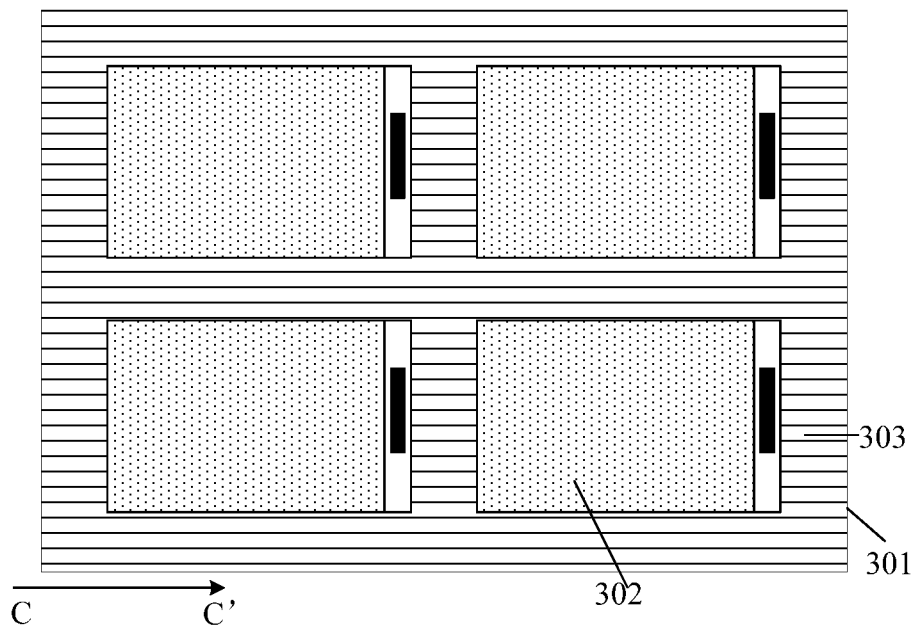
Figure 2D:
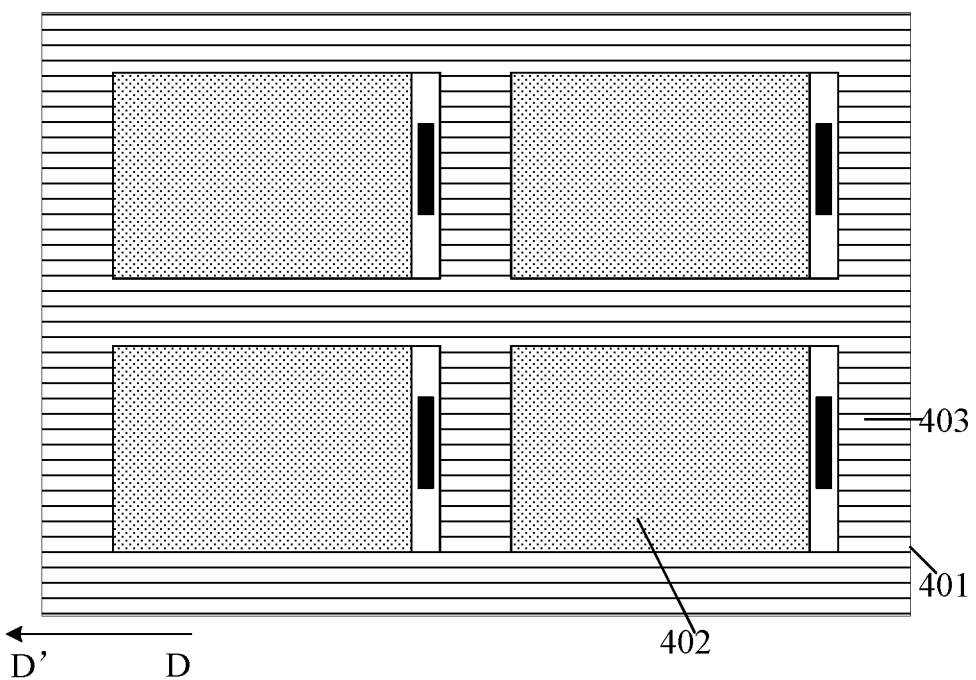

For example, for a liquid crystal panel of an ADS (FFS) mode, as illustrated in FIGS. 2c and 2d, the first motherboard includes a first base substrate 301 and a plurality of array substrate units 302 arranged in a matrix on the first base substrate 301, and the second motherboard includes a second base substrate 401 and a plurality of counter substrate units 402 arranged in a matrix on the second base substrate 401; the first motherboard further includes a line layer 303 insulated from the array substrate units 302 and arranged along a first extending direction CC', which is disposed in a peripheral space region of the array substrate units 302; and the second motherboard further includes a line layer 403 insulated from the counter substrate units 402 and arranged along a second extending direction DD', which is disposed in a peripheral space region of the counter substrate unit 402. The first extending direction CC' and the second extending direction DD' in the drawings of this embodiment are only schematic, and they may be other extending directions; and in general, for the liquid crystal panel of the ADS (FFS) mode, CC' and DD' are parallel to each other.

Further, in the above-described cell-assembled motherboards provided by the embodiment of the present disclosure, since both opposed surfaces of the array substrate unit and the counter substrate unit have the alignment films, in order that liquid crystal molecules can have their long axis direction arranged regularly along a direction of a groove mark of the alignment film, in a rubbing process, rubbing directions of the alignment film on opposing surfaces of the array substrate unit and the counter substrate unit are opposite, and the preset extending direction of a line in the line layer may be the same as the preset direction of the groove mark of the alignment film, and thus, the first extending direction and the second extending direction may be opposite to each other, so that it ensures that after the rubbing process, the liquid crystal molecules can have their long axis direction arranged along one direction. As illustrated in FIGS. 2a and 2b, the first extending direction AA' extends from top to bottom along a certain inclined angle, and the second extending direction BB' extends from bottom to top along a same inclined angle; as illustrated in FIGS. 2c and 2d, the first extending direction CC' extends from left to right, and the second extending direction DD' extends from right to left. In actual fabrication, for the preset extending direction of the line in the line layer, as long as it meets a condition that the preset extending direction of the line is the same as the preset direction of the groove mark of the alignment film, which is not limited here.

It should be noted that, structures of other components in the array substrate unit are similar to those of corresponding components in the existing array substrate, a fabrication process of other components in the array substrate unit is similar to that of the existing array substrate; and structures of other components in the counter substrate unit are similar to those of corresponding components in the existing counter substrate, and a fabrication process of other components in the counter substrate unit is similar to that of the existing counter substrate, which will not be repeated here.

For example, first of all, the plurality of array substrate units arranged in a matrix are fabricated on one motherboard, then the motherboard is cell-assembled with the motherboard having the plurality of counter substrate units arranged in a matrix fabricated thereon, and the two motherboards are respectively cut along a region where the counter substrate unit is located and a region where the array substrate unit is located, to form a plurality of small liquid crystal display panels.

An embodiment of the present disclosure further provides a liquid crystal display panel, and the liquid crystal display panel is obtained by cutting the above-described box-formed motherboard provided by the embodiment of the present disclosure. Since the line layer is disposed in the peripheral space region of the motherboard, when the respective liquid crystal display panels are cut after cell-assembling, it is necessary to cut off the line layer. The embodiment of the above-described cell-assembled motherboards may be referred to for the specific implementation mode of the liquid crystal display panel, which will not be repeated herein. In addition, a region corresponding to the substrate unit on the motherboard substantially forms a display region of the display panel, and a region of the periphery of the substrate unit forms the peripheral region. Thus, on the basis of the array substrate and the counter substrate included in the liquid crystal display panel, the line layer is formed in the peripheral region of the periphery of the display region.

An embodiment of the present disclosure further provides a display device, comprising the above-described liquid crystal display panel provided by the embodiment of the present disclosure, and the display device may be: a mobile phone, a tablet personal computer, a television, a monitor, a laptop computer, a digital photo frame, a navigator, or any other product or part having a display function. For all the other essential composite parts of the display device, those ordinarily skilled in the art should understand that there are the same, which will not be repeated here, and should not be a limitation to the present disclosure. For implementation of the display device, the embodiments of the above-described liquid crystal display panel can be referred to, and repeated sessions will not be illustrated here.

The motherboard, the cell-assembled motherboards, the liquid crystal display panel and the display device provided by the embodiments of the present disclosure, includes: a base substrate, a plurality of substrate units arranged in a matrix on the base substrate, and a line layer insulated from the substrate units and arranged along a preset extending direction which is disposed within a peripheral space region of the substrate units; since the line layer arranged along the preset extending direction is disposed within the peripheral space region of the substrate unit, when the alignment film on the substrate unit is aligned by using the rubbing process, it can play a role in carding the rubbing cloth used in the rubbing process, to achieve the even rubbing effect, avoid the uneven rubbing phenomenon, and further facilitate to improve the picture quality of the display panel.

The foregoing embodiments merely are exemplary embodiments of the present disclosure, and not intended to define the scope of the present disclosure, and the scope of the disclosure is determined by the appended claims.

The application claims priority of Chinese Patent Application No. 201510300328.X filed on Jun. 3, 2015, the disclosure of which is incorporated herein by reference in its entirety as part of the present application.

The invention claimed is:

1. A motherboard of a display panel, comprising a first motherboard and a second motherboard disposed opposite to each other; the first motherboard including a first base substrate and a plurality of substrate units arranged in a matrix on the first base substrate, and the second motherboard including a second base substrate and a plurality of substrate units arranged in a matrix on the second base substrate, wherein,
at least one of the first motherboard and the second motherboard further includes a line layer insulated from the substrate units and arranged along a preset extending direction, which is disposed in a peripheral region of the substrate units,
the motherboard of the display panel further comprises an alignment film disposed on the line layer and the substrate units, on at least one of the first motherboard and the second motherboard, and the line layer is disposed on a same layer with a transparent electrode layer in the substrate units,
wherein widths of respective lines in the line layer are 13 μm to 15 μm, and heights of the respective lines in the line layer are 200 Å to 1000 Å.

2. The motherboard of the display panel according to claim 1, wherein the first motherboard is a motherboard of an array substrate, one substrate unit of the substrate units on the first motherboard is an array substrate unit; the second motherboard is a motherboard of a counter substrate, and the substrate unit on the second motherboard is a counter substrate unit.

3. The motherboard of the display panel according to claim 2, wherein an extending direction of a line in the line layer on the first motherboard is a first extending direction, an extending direction of a line in the line layer on the second motherboard is a second extending direction, and the first extending direction and the second extending direction are perpendicular to each other.

4. The motherboard of the display panel according to claim 2,
wherein the alignment film has a groove mark of a preset direction as rubbed by a rubbing cloth; and the preset extending direction of the line in the line layer is the same as the preset direction of the groove mark of the alignment film.

5. The motherboard of the display panel according to claim 1, wherein an extending direction of a line in the line layer on the first motherboard is a first extending direction, an extending direction of a line in the line layer on the second motherboard is a second extending direction, and the first extending direction and the second extending direction are perpendicular to each other.

6. The motherboard of the display panel according to claim 1, wherein a minimum distance between adjacent lines in the line layer is the same as a diameter of floss on the rubbing cloth.

7. The motherboard of the display panel according to claim 6, wherein the minimum distance between the adjacent lines in the line layer is 13 μm to 15 μm.

8. The motherboard of the display panel according to claim 1, wherein the line layer is of a single-layer structure or a multi-layer structure.

9. The motherboard of the display panel according to claim 1,
wherein the alignment film has a groove mark of a preset direction as rubbed by a rubbing cloth; and the preset extending direction of the line in the line layer is the same as the preset direction of the groove mark of the alignment film.

10. A liquid crystal display panel, comprising: an array substrate and a counter substrate cell assembled with each other, both the array substrate and the counter substrate including a display region and a peripheral region located in the periphery of the display region, wherein,
the peripheral region of at least one of the array substrate and the counter substrate includes a line layer arranged along a preset extending direction,
the liquid crystal display panel further comprises an alignment film disposed on the line layer and the display region, on at least one of the array substrate and the counter substrate, and the line layer is disposed on a same layer with a transparent electrode layer in the substrate
wherein widths of respective lines in the line layer are 13 μm to 15 μm, and heights of the respective lines in the line layer are 200 Å to 1000 Å.

11. The liquid crystal display panel according to claim 10, wherein an extending direction of a line in the line layer on the array substrate is perpendicular to an extending direction of a line in the line layer on the counter substrate.

12. A display device, comprising the liquid crystal display panel according to claim 10.

13. The liquid crystal display panel according to claim 10, wherein the alignment film has a groove mark of a preset direction as rubbed by a rubbing cloth; and the preset extending direction of the line in the line layer is the same as the preset direction of the groove mark of the alignment film.

14. A motherboard, comprising: a base substrate, and a plurality of substrate units arranged in a matrix on the base substrate, wherein
a peripheral region of the substrate units is provided with a line layer insulated from the substrate units and arranged along a preset extending direction,
the motherboard further comprises an alignment film disposed on the line layer and the substrate units, and the line layer is disposed on a same layer with a transparent electrode layer in the substrate units,
wherein widths of respective lines in the line layer are 13 μm to 15 μm, and heights of the respective lines in the line layer are 200 Å to 1000 Å.

15. The motherboard according to claim 14, wherein the alignment film has a groove mark of a preset direction as rubbed by a rubbing cloth; and the preset extending direction of a line in the line layer is the same as a preset direction of the groove mark of the alignment film.

16. The motherboard according to claim 15, wherein a minimum distance between adjacent lines in the line layer is the same as a diameter of floss on the rubbing cloth.

17. The motherboard according to claim 16, wherein the minimum distance between the adjacent lines in the line layer is 13 μm to 15 μm.

18. The motherboard according to claim 14, wherein the line layer is of a single-layer structure or a multilayer structure.

* * * * *